United States Patent
Watanabe et al.

[11] Patent Number: 5,886,646
[45] Date of Patent: Mar. 23, 1999

[54] DATA DISPLAY SYSTEM BASED ON A PAGING SIGNAL

[75] Inventors: Isao Watanabe, Nishi Katsura-machi; Ken Watanabe, Kawaguchiko-machi; Yoshichika Watanabe, Fujiyoshida-city; Osamu Furuya; Yuzo Miura, both of Kawaguchiko-machi, all of Japan

[73] Assignee: Kokusai Electric Co., Ltd., Tokyo, Japan

[21] Appl. No.: 761,203

[22] Filed: Dec. 6, 1996

[30] Foreign Application Priority Data

Dec. 7, 1995 [JP] Japan .................................... 7-318889
Jan. 5, 1996 [JP] Japan .................................... 8-000237
May 29, 1996 [JP] Japan .................................... 8-157505

[51] Int. Cl.$^6$ ............................. H04M 11/00; G08B 5/00
[52] U.S. Cl. .............................. 340/825.44; 340/825.47; 370/310; 455/31.1; 455/404
[58] Field of Search ..................... 340/825.44, 825.47, 340/311.1; 455/31.1, 31.2, 32.1, 38.4, 404, 415; 379/56.1, 77, 142; 370/310, 312, 313

[56] References Cited

U.S. PATENT DOCUMENTS

| | | |
|---|---|---|
| 4,994,797 | 2/1991 | Breeden ............................. 340/825.44 |
| 5,043,721 | 8/1991 | May .................................... 340/825.44 |
| 5,166,932 | 11/1992 | Hoff et al. ............................. 370/95.1 |
| 5,257,307 | 10/1993 | Ise .............................................. 379/57 |
| 5,315,635 | 5/1994 | Kane et al. ............................... 379/57 |
| 5,317,621 | 5/1994 | Shibayama ............................... 379/57 |
| 5,446,678 | 8/1995 | Saltzstein et al. .................. 364/514 R |
| 5,574,439 | 11/1996 | Miyashita ........................... 340/825.44 |
| 5,617,083 | 4/1997 | Schwendeman et al. ......... 340/825.44 |
| 5,705,995 | 1/1998 | Laflin et al. ....................... 340/825.44 |

FOREIGN PATENT DOCUMENTS

WO 94/03019  2/1994  WIPO .

*Primary Examiner*—Michael Horabik
*Assistant Examiner*—Yonel Beaulieu
*Attorney, Agent, or Firm*—Antonelli, Terry, Stout & Kraus, LLP

[57] ABSTRACT

For effectively achieving remote a display at long distance by using paging system, there is provided a personal computer, coding information to be transmitted into message code, dividing it into sub-message code which can be transmitted by one time of transmission operation of the paging system, and automatically transmits them in sequence. The message code sent through the paging system is received with a page adapter and input to a display device. The display device interprets the message code and generates display data to perform the display and control thereof.

12 Claims, 11 Drawing Sheets

| DISPLAY ITEM | OUTPUT CONTROL DATA | OUTPUT DATA |
|---|---|---|
| PAGE | 01 | 1 |
| LINE | 01 | 2 |
| 1ST DATA | 16 | 1623 5678 2354 9838 |
| 2ND DATA | 20 | 0002 0001 0003 0000 1428 |
| DISPLAY | 01 | 1 |
| AUDIO | 02 | 05 |
| ⋮ | ⋮ | ⋮ |

FIG. 12

| HEADER | 010116 ------ | 1 2 1623 5678 2354 9838 ------ |
|---|---|---|

| | PAGE | LINE | 1ST DATA | 2ND DATA | EMERGENCY | AUDIO | PRESENT DISPLAY | LAST DATE |
|---|---|---|---|---|---|---|---|---|
| ORDINARY AREA | 1 | 1 | ACTUAL MARKET INDEX | 0.003% | 1 | 5 | 1 | --- |
| | 1 | 2 | ESTIMATED AMOUNT OF MONEY | 2.130¥ | 1 | 0 | 1 | --- |
| | --- | --- | --- | --- | --- | --- | --- | --- |
| | 2 | 1 | | | 1 | 0 | 0 | --- |
| | 2 | 2 | | | 1 | 1 | 0 | --- |
| | --- | --- | --- | --- | --- | --- | --- | --- |
| EMERGENCY AREA | — | | XX COMPANY | ANNOUNCE SALE INCREASE | 0 | 1 | | --- |
| | — | | OX COMPANY | ANNOUNCE SALE DECREASE | 0 | 0 | | --- |
| | --- | --- | --- | --- | --- | --- | --- | --- |

DATA DISPLAY SYSTEM BASED ON A PAGING SIGNAL

BACKGROUND OF THE INVENTION

The present invention relates to a data display system for a so called a pager signal, in particular to a data display system based on a paging signal, in which display data or information to be broadcast is transmitted through a pager to be displayed on data display means or to be output as audio signal.

DESCRIPTION OF PRIOR ART

Conventionally, regarding a pager, such a device as disclosed in Japanese Patent Application Laid-Open No. 6-118937 (1994) entitled "Wireless Code Signal Receiver" has been already known. In this prior art, a wireless paging signal is received by an antenna, and it is informed that the wireless paging signal be received through a receiver or a decoder and a speaker or a vibrator as well as displaying message data on the display of the pager.

Figure 2:
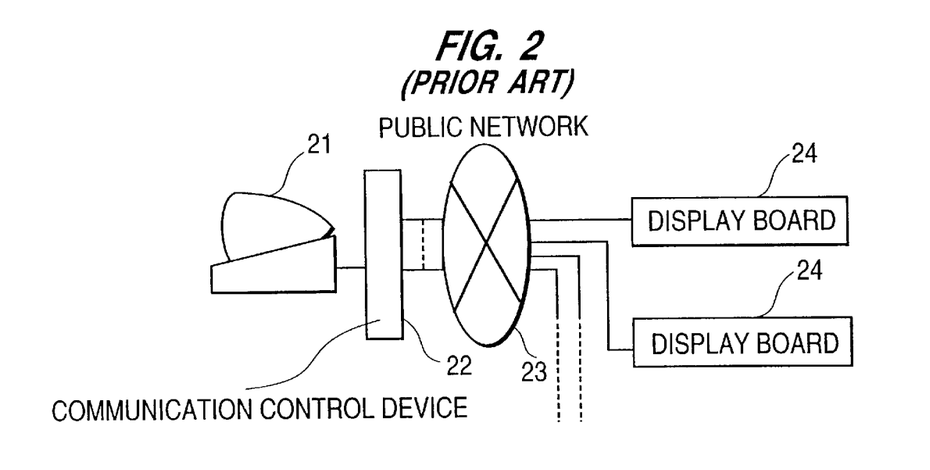
FIG. 2 is a block diagram showing a conventional information display device.

FIG. 2 is a block diagram showing a construction of conventional information display system, wherein the information is transmitted through a public telephone network (or an exclusive line) to be displayed. Namely, bank headquarters managing terminal 21 sets display conditions for various kinds of message inputs. A communication control apparatus 22 transforms or exchange the data from the terminal 21 into a signal (data) having a format applicable to the public telephone network 23, and transmits it thereto. Display boards 24 receive the data transmitted as a unit of each board through the public telephone network and display it.

As an example of such information display system mentioned above, an apparatus disclosed by Japanese Patent Application Laid-Open No. 7-44119 (1995) entitled "A Fluorescence Display Tube And An Information Display Device Using thereof" has been known. Such device is used for instance in for a financial company including a bank and a stockbroker, or for information of a hospital. For instance, in a bank, one or several units of display boards are set in each branch office, and financial information from a head office is received through the public network and displayed on the delay boards. And, in the hospital, the display board(s) is/are set near a reception area, and information is displayed thereon, including names of doctors in charge of respective sections, a schedule and an order of medical examination and treatments. In this case, the instruction of display information is given by the reception area through an exclusive line in many cases. However, it is sometimes transmitted through the public network in a large hospital.

The inventors of the present invention have been developing and taking part in production of a display board for use in such information display devices as mentioned above. Here, the size of the display board for example, height:width:depth=a few 10 cm:a few 10 cm:a few cm, and there is a vertical type having a large height and a horizontal type having a large width. The line number of the display is, for example, 6 lines type, 9 lines type, and 12 lines type, and the row or digit number is for example 10 words or 16 words by full size. The display size of a line is, for example, height:width=25 mm:315 mm. As a display medium is used a LED, LCD or a fluorescence display tube. With setting forms, there are a wall hanging type, and a stand type.

Further, as a technique of displaying on the display board as mentioned above, by using a paging system but not the wire line as an ordinal public telephone network, "Wireless Telemeter Device" disclosed in Japanese Patent Application Laid-Open No. 5-227317 (1993) and "Remote Control Method By Using Wireless Calling System" disclosed in Japanese Patent Application Laid-Open No. 7-67162 (1995) have been known. In those devices, data indicating a parking condition within a parking area, for example, is collected and changed into a code using letters, or characters which can be transmitted with a paging system. The code is transmitted through the paging system to a pager terminal, and it is displayed on a display of the pager at a receiving portion. Moreover, by reading the displayed letters or characters optically and decoding the codes presented by lines of the letters or characters, the display information is taken out from a memory means storing display information corresponding to the codes and is displayed on a display means.

Such system in which the paging system is used as a transmission line has an advantage that an information display system can be constructed economically, since by using the pager terminals, there is no need for facilities of a wireless circuit assigned with a radio frequency of exclusive use, or, wiring from the terminals to the display boards when using the wired public network or an exclusive telephone network.

Since, with the paging system which is generally and widely used, the amount of data which can be transmitted by one transmission operation is limited, for example, to around 10 characters by letter or character code data, a transmitter, when attempting to transmit a large amount of data, must divide the data into sub-data and repeat the transmission operation many times for respective divided sub-data. Namely, a complicated transmission operation of calling up a service center of the system by inputting the telephone number of the pager through the telephone and sending it after the information message is given must be repeated. From this, when sending relatively complicated control of display, since it requires a large amount of data transmission, the transmission operation must be repeated repetitively. Therefore, the operation not only makes trouble and takes much time, but is also likely to cause mis-operation or mis-input, since the input of the same telephone number must be repeated many time, and it has a drawback that it is difficult to perform the display from a distance with certainty and rapid display control.

SUMMARY OF THE INVENTION

Therefore, an object of the present invention is to provide a data display system based on a paging signal, by which transmission of a large amount of data can be achieved with certainty and rapidity by using the known paging system.

Another object of the present invention is to provide a data display system based on a paging signal, by which a message can be transmitted and can be displayed with high efficiency, which is specific to respective areas or groups, etc.

For achieving the above-mentioned objects, according to the present invention, there is disclosed a data display system based on a paging signal comprising:

a transmission terminal for coding message for display and control information into message codes, for dividing the message codes into sub-message codes, each having a length so as to be transmitted by one transmission operation in a paging system, for forming a transmission signal of the paging system by adding an ID code for calling-up a respective one of the sub-message codes, and for transmitting thereof sequentially by automatically accessing a public network;

a pager adapter for receiving the transmitted signal registered with the ID code from the transmission terminal through the public network and a wireless base station of the paging system so as to take out the message codes;

a display member; and a display controller for processing the message codes from the pager adapter so as to form display data to be displayed on the display member and to control the display thereof.

Further, according to a feature of the present invention, there is provided a data display system based on a paging signal as described above, wherein the transmission terminal further includes a signal sound detector for detecting sound of an input waiting signal to be responded from a terminal station of the public network which receives the ID code, after generating the ID code, thereby to send one of the sub-message codes when the signal sound detector detects the input waiting signal.

According to another feature of the present invention, there is provided a data display system based on a paging signal as described above, wherein the transmission terminal further includes a timer which starts when the ID code is generated, and for outputting an input signal when a preset time expires, thereby to send one of the sub-message codes when the timer ouputs the input signal.

According to a further feature of the present invention, there is provided a data display system based on a paging signal as described above, wherein the transmission terminal further includes interception signal generator to intercept an information message to be responded from a terminal station of the public network which receives the ID code, and starting at the same time of the output thereof and outputting an input signal when a preset time expires, thereby to send one of the sub-message codes when the interception signal generator generates the input signal.

In accordance with another feature of the present invention, the display controller includes a letter code exchange table, thereby exchanging a letter code within the message code into a letter data which can be displayed on the display member by using said letter code exchange table.

According to the present invention, the display controller further includes an audio code exchange table and an audio signal generator, and the display member includes a speaker, thereby exchanging an audio code within the message code into an audio data by using the audio code exchange table and exchanging the audio data into an audio signal with the audio signal generator so as to provide an output to the speaker.

Further, according to a feature of the present invention, the display control signal includes an information indication necessity of an emergency display.

According to another feature of the present invention, the pager adapter is also registered with another ID code for broadcasting use other than the ID code of the pager adapter.

In accordance with a further feature of the present invention, the display controller includes a letter code exchange table, thereby exchanging a letter code within the message code into letter data which can be displayed on the display member by using the letter code exchange table.

Further, according to the present invention, the display controller is constructed so that the letter code exchange table is variably presetable.

According to another feature of the present invention, the display controller includes an audio code exchange table and audio signal generator, and the display member includes a speaker, thereby exchanging an audio code within the message code into audio data by using the audio code exchange table and exchanging the audio data into an audio signal with the audio signal generator providing an output to the speaker.

Further, according to the present invention, the audio code exchange tile is constructed so that it is variably presetable.

Additionally, according to the present invention, the display control signal includes an information indication necessity of emergency display.

The invention will be more fully comprehensive by the following detailed description of preferred embodiments.

DETAILED DESCRIPTION OF PREFERRED EMBODIMENTS

Figure 1:
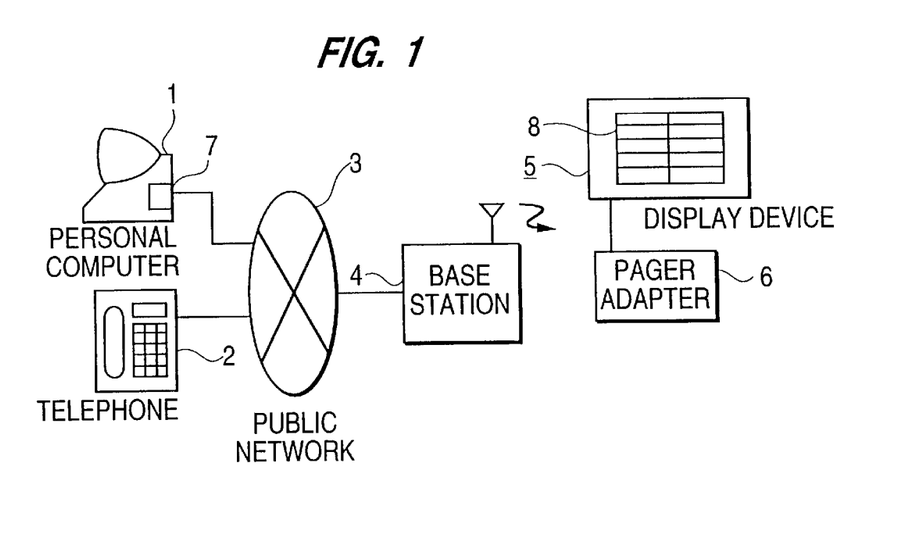
FIG. 1 is a block diagram showing an embodiment of a data display system based on a paging signal according to the present invention.

Hereinafter, embodiments according to the present invention will be fully explained by referring to the attached drawings. FIG. 1 is a block diagram showing construction of a data display system based on paging signal according to the present invention, in which construction information is transmitted and displayed on a display device through a paging system. In the figure, a personal computer (PC) 1 and a telephone 2 as a transmission device are connected to a public network 3 to which network is connected a base station 4 of a paging system. The public network 3 is coupled to a pager adapter 6, and the pager adapter 6 is transmitted data through radio wave from the base station 4. Here, the personal computer 1 is connected to the public network 3 through a modem 7, therefore, serial data provided from the personal computer 1 is modulated with the modem 7 and transmitted to the public network. A display device 5 includes a display board 8 constructed with photo emission diodes aligned, and on the display board 8 is output and/or displayed a message, etc. Here, the personal computer 1 is adopted as the transmission devices, however, even another device can be applied thereto in place of that as far as having such functions as mentioned below.

Figure 3:
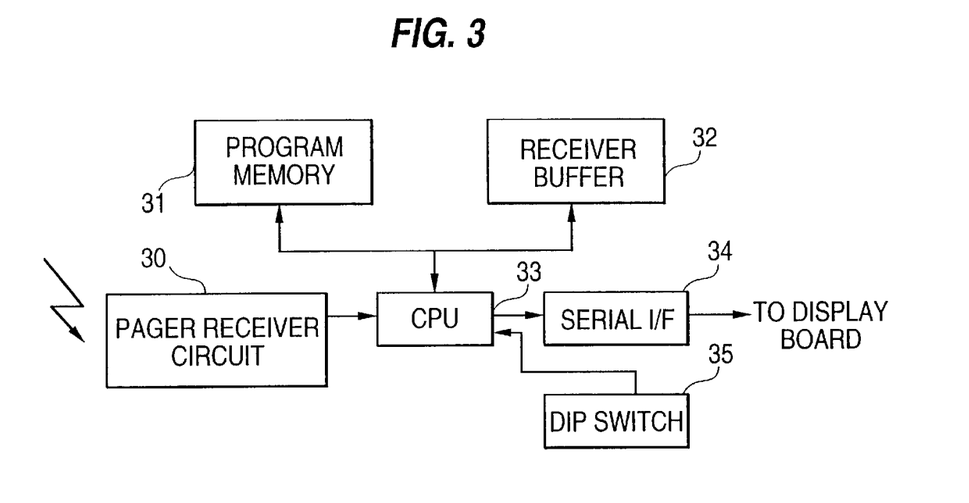
FIG. 3 is a block diagram showing a pager adapter in accordance with the present invention.

FIG. 3 is a block diagram showing a construction of the pager adapter 6, which includes a pager receiving circuit 30, a program memory 31, a receiver buffer 32, a central processing unit (CPU) 33, a serial interface (I/F) 34, and a dip switch 35. The program memory 31 stores therein a program for performing a function of a receiving process of a message code from the pager receiving circuit 30. The receiver buffer 32 stores the message code received sequentially therein. The CPU 33 reads out the program stored in the program memory 31, and conducts an access to the receiver buffer 32, transfer to the serial I/F 34 and checking of the dip switch 35.

Figure 4:
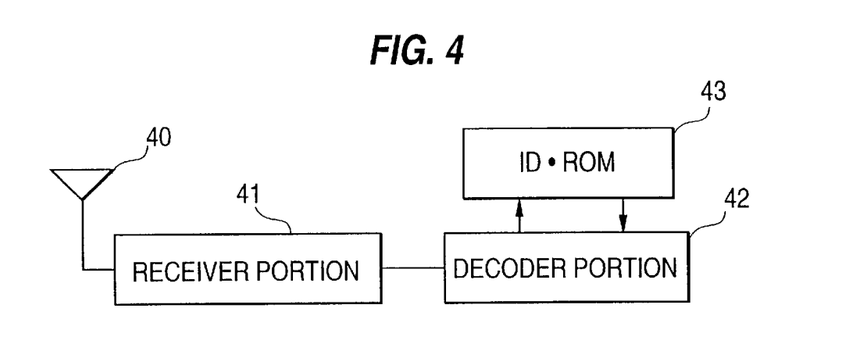
FIG. 4 is a block diagram showing a pager receiving circuit in accordance with the present invention.
Figure 5:
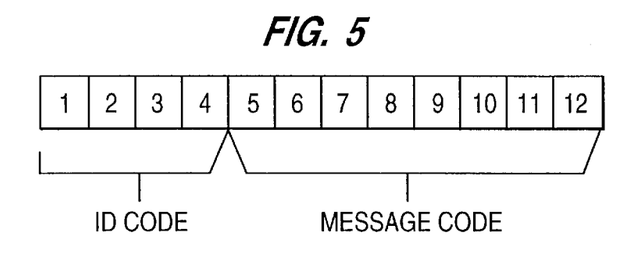
FIG. 5 shows a format of a transmission code of a pager system according to the present invention.

FIG. 4 is a block diagram showing a construction of the pager receiving circuit 30 within the pager adapter 6 of FIG. 3, and includes an antenna portion 40, a receiver portion 41, a decoder portion 42 and a so-called ID-ROM 43. This circuit has a function equal to that of an ordinary pager terminal, but without the functions of display, reception information and message memory and a controller thereof. With the paging system, as is shown for example in FIG. 5, it is possible to send totally 12 digit numeral (or code) by one time of transmission process, including 4 digit (4 figures) of the ID code (telephone number of pager) and 8 digit (8 figures) which is available to be used as the message code. The receiver portion 41 of FIG. 4 serves to take out data of the 12 digits with the decoder portion 42 comparing the ID code of 4 digits to an ID code which is assigned to the machine per se and stored in the ID-ROM 43, and if they are coincident, it decides that the signal is designated to the machine per se so as to send out the following 8 digit message code to the CPU 33 shown in FIG. 3. This message code is stored in the receiver buffer. In this way, the transmission route is formed by also receiving the assignment of the telephone number of the paging system to the pager receiving circuit 30 of FIG. 3.

Figure 6:
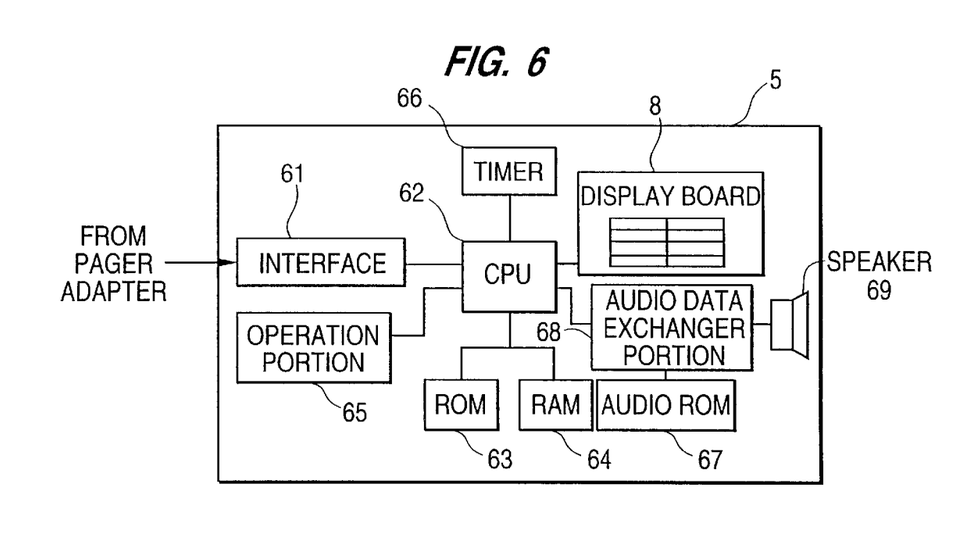
FIG. 6 is a block diagram of a display device according to the present invention.

Then, the, message code received by the pager adapter 6 in the manner mentioned above is transmitted to the display device 5 of FIG. 1, for example by a stop-start synchronizing method. FIG. 6 shows a construction of the display device 5 which comprises a display board 8 and a speaker as a display unit, an interface 61 for receiving the message code sent from the pager adapter 6, a CPU 62 for data processing, a ROM for storing a process program to be executed by the CPU 62, a RAM 64 for use of storage of the received message signal, etc., an operation portion 65 including an operation button for externally setting the processing operation of the CPU 22 and an optical receiver portion of a remote control, etc., a timer 66 for instructing timing condition to the processing operation by the CPU 62, an audio ROM 67 for storing an audio exchange table and an audio data exchanger portion 68 for exchanging an audio data corresponding to the message code into an audio signal by referring to the above audio exchange table and for amplifying thereof, and a speaker 69 for outputting the audio signal as a display control unit.

With the data display system based on a paging signal which is explained above, it takes much time and also needs repetitive operations, when trying to send a large amount of data to the display device, since ordinarily only a message code of 8 digits can be transmitted by one transmission operation as mentioned previously, thereby also increasing the probability of mis-operation. Therefore, according to the present system, the data to be transmitted is divided into sub-data of length which can be transmitted by one transmission operation, and they are sent automatically one by one. Thereby, it is aimed to shorten the transmission time and to eliminate unnecessary complicated operations by a person.

Figure 7:
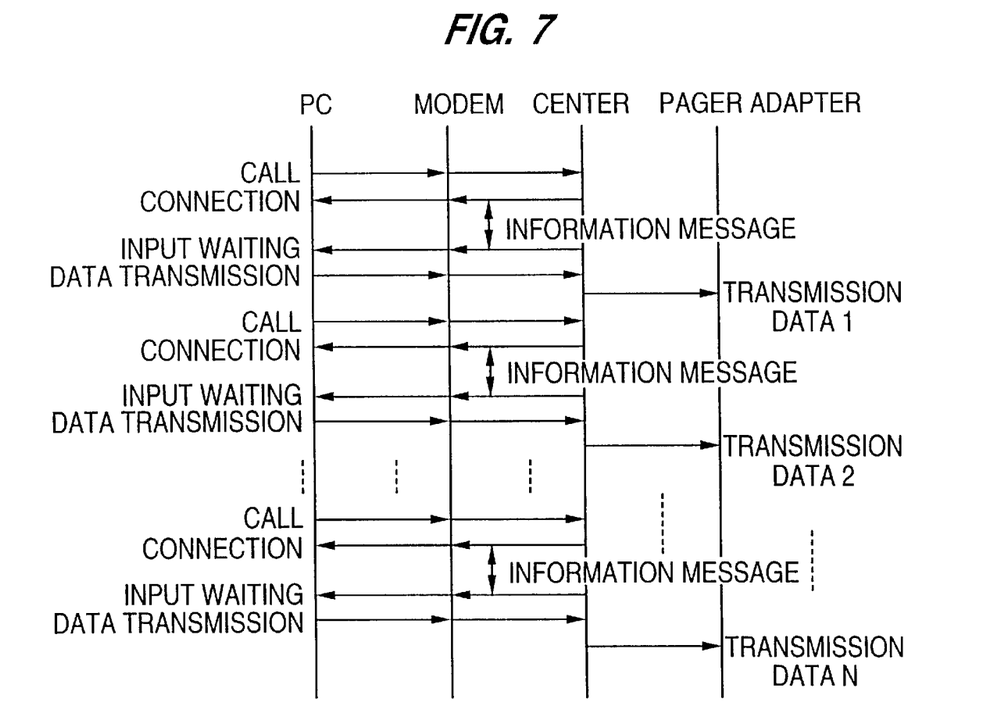
FIG. 7 shows a timing operation of an automatic transmission method based on the pager system of the present invention.
Figure 15:
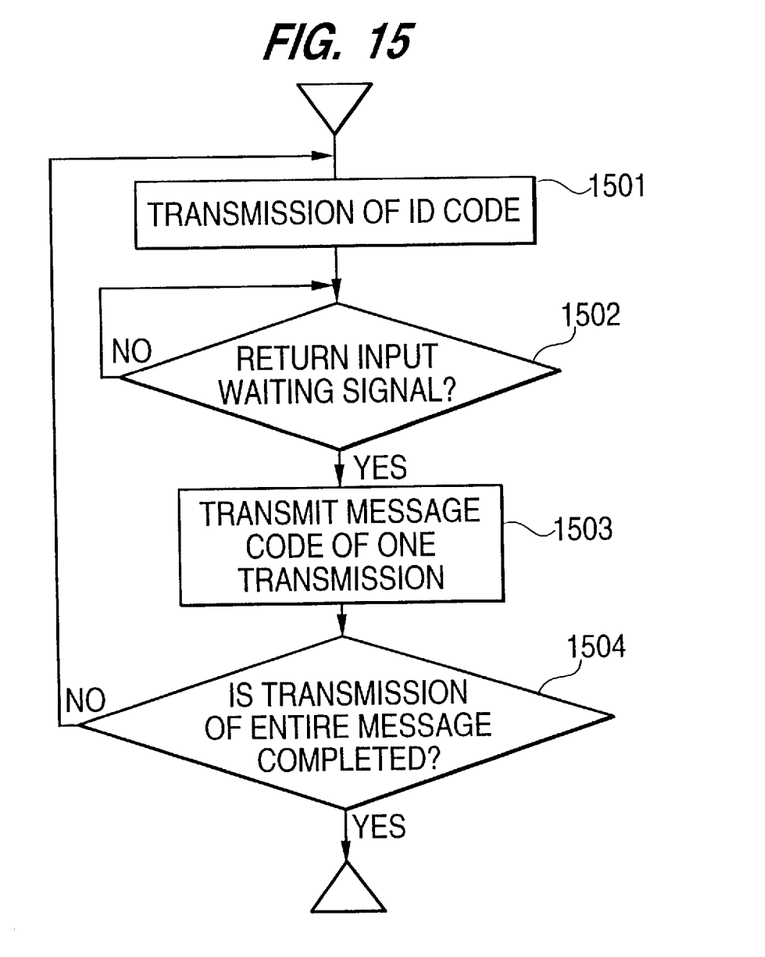
FIG. 15 is a flow chart showing an automatic transmission process of the message code according to the present invention.

FIG. 15 is a flow chart showing an example of the process of data transmission in accordance with the present invention, and FIG. 7 shows a time chart for explaining the operation thereof. In the paging system, when a dial signal for calling the pager adapter 6 is generated by the personal computer 1 (see, calling in FIG. 7, step 1501 in FIG. 15), it is sent to a center (a station of the public network) through the modem 7. The center performs connection (see, connection in FIG. 7) through the center 3 which is called up and the base station 4 when it receives the call, and returns back an information message and a signal tone for inducing an input of the message code in a predetermined time duration (see, input waiting in FIG. 7) when the information message is completed. Since the frequency and the time duration are previously determined, when the personal computer 1 makes certain of the return of the signal tone through the modem 7 (see, "YES" at step 1502 in FIG. 15), one of the divided sub-message codes is sent by one data transmission (see, data transmission in FIG. 7). The center receives the data, and sends it to the pager adapter through the public network. When the first transmission is completed in such manner as mentioned above, the personal computer successively starts a second transmission, and thereafter repeats the same operation up to the necessary number of time n (see, step 1504 in FIG. 15). Thereby, the data, which is transmitted by dividing into a plurality of portions and received by the pager receiving circuit 30 in FIG. 3, is stored into the receiving buffer 32 in sequence within the pager adapter 6.

Figure 16:
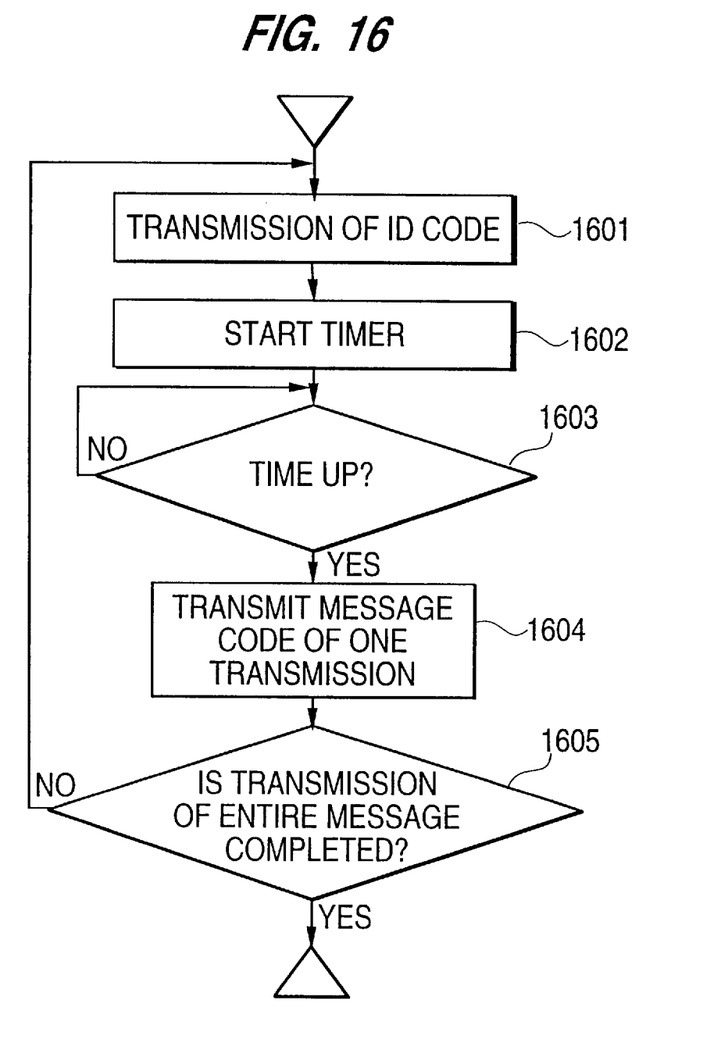
FIG. 16 is a flow chart showing another automatic transmission process of the message code according to the present invention.

Another simple method may be utilized in place of the above-described data transmission method. The flow chart of this simple method is shown in FIG. 16, wherein the connection to the pager adapter is completed within an appropriate preset time period, after the calling is generated from the personal computer 1 to the pager adapter, even though the time for it is not constant. The time period during which the information message is given is constant. Therefore, providing a timer having a preset time equal to the sum of those times, just after the transmission of the ID code (see, calling generation: step 1601), the timer is started (see, step 1602). The time elapsing after the call generation reaches to the preset time (see, "YES" in step 1603), the message code for one time of transmission is sent (see, step 1604), and the above operation is repeated until the completion of transmission of all the code (see, step 1605).

Figure 8:
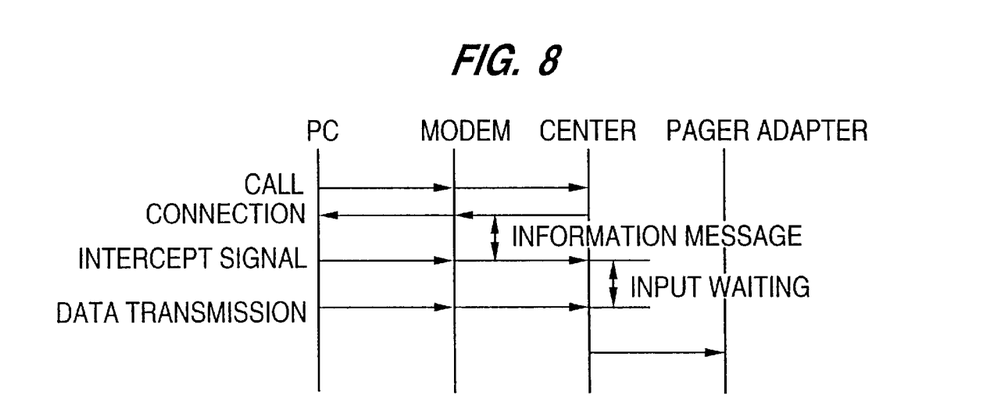
FIG. 8 shows a timing operation of an another automatic transmission method based on the pager system of the present invention.
Figure 17:
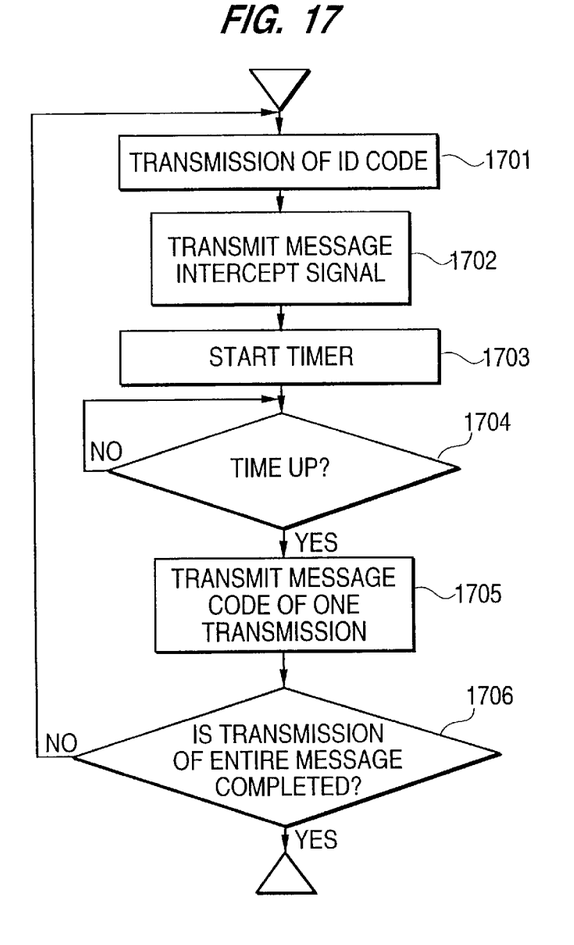
FIG. 17 is a flow chart showing a further automatic transmission process of the message code according to the present invention.

Another method will be explained by the flow chart of FIG. 17 and the time chart of FIG. 8 for explanation of operation thereof. According to this method, when calling is generated from the personal computer 1 (see, calling in FIG. 8, step 1701 in FIG. 17), connection to the pager adapter is carried out through the public network in the same manner in FIG. 7. (connection in FIG. 8), then an information message is sent back from the center. Here, the personal computer 1 detects that the connection to the pager adapter is completed, by the fact that the calling tone disappears and a busy tone is not yet sent back in the same manner of the facsimile machine, then it outputs an information message interception signal (see, intercept signal in FIG. 8, step 1702 in FIG. 17). This signal is a tone signal which has a preset frequency and time duration. After generating the information message interception signal in this way, the timer checks if the preset time duration elapses or not. If it elapses (steps 1703, 1704), the message code for one time transmission is sent (step 1705). Although FIG. 8 shows only steps for performing one time transmission, a desired length of data can be transmitted by repeating the steps. Further, according to this method, the transmission time of one time can be shortend by intercepting the information message.

In the system in FIG. 1, it is possible to transmit the data of the necessary amount automatically and at high speed, as mentioned above. Although the message code can be transmitted even from the telephone 2 in FIG. 1, it operates only as an auxiliary means since it cannot automatically transmit a large amount of data. In this way, automatic transmission of a large amount of data is made possible, and various display and display control thereof for the large amount of data by using such feature are realized as shown below.

Figure 9:
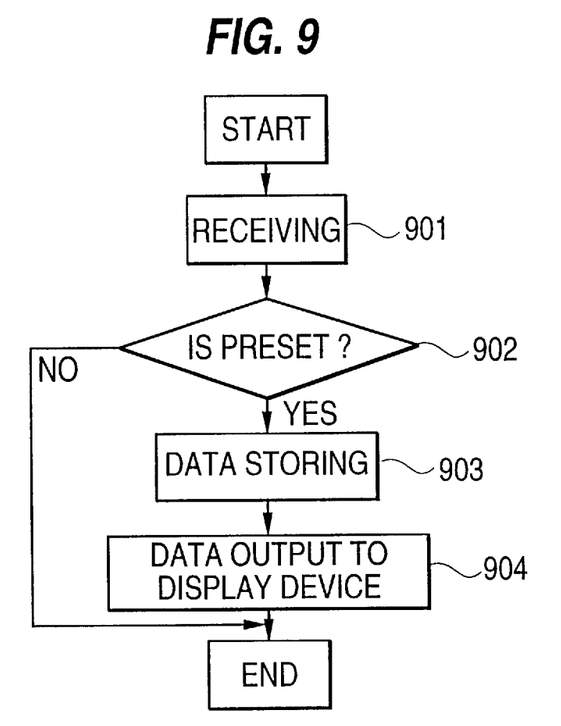
FIG. 9 is a flow chart showing an operation of the pager adapter according to the present invention.

FIG. 9 is a flow chart showing a reception process of the pager adapter 6, in which, when the data sent from the personal computer 1 as mentioned previously is received with the pager receiving circuit 30 (step 901), the CPU 33 checks the setting condition of the dip switch 35 in FIG. 3 (step 902). The dip switch 35 is provided for purpose of presetting whether to perform the process for the display according to the present invention or to enable use for other purposes. If the process for the display according to the present invention is preset, the received data is stored into the receiver buffer 32 in sequence (step 903).

Figure 10:
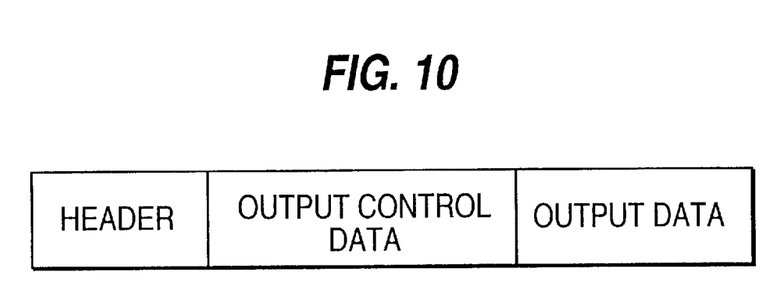
FIG. 10 shows a format of a message code to be transmitted according to the present invention.

The message code which is received and then stored is data having a format such as shown in FIG. 10. Namely, making a unit of any amount of data, for example, a data for displaying on one line of the display board, it is formed with a header located at the beginning an output control data for indicating the contents of the output data and then the output data per se.

Here, the header has a code for designating the beginning of the record and information showing the number of the output control data. With the output control data and the for output data, explanation will be given hereinafter referring for example to FIG. 11. This example is an over-the-counter display in a stockbrokeor office, wherein "page" or "line" in the output control data indicates a digit number of an output data indicating the page number or the page number of the record in the data. Here, both of them are one digit. The output data "1" and "2" corresponding to that indicate the data is that of a 1st page and 2nd line. The value of "1st data" and "2nd data" of the output control data indicate the digit number of the respective output data, here they indicate sixteen digits and twenty digits.

Figure 11:
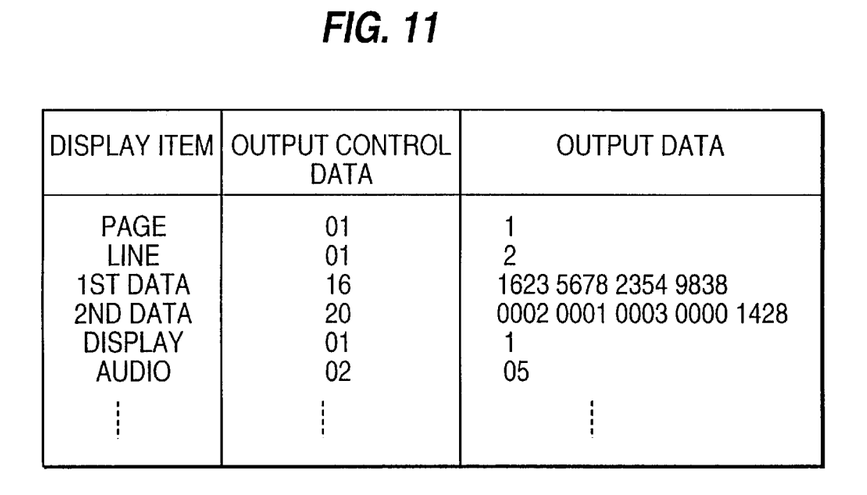
FIG. 11 shows an example of the message code according to the present invention.

The output data corresponding to them, i. e., "1623 5678 2354 98 38" and "0002 0001 0003 0000 1428" are codes indicating letters, and every four digits represent one letter or character. For example, here, "1623"="予", "5678"="想", "2354"="金", "9838"="額", "000x"="x" (here, "x" is a numerical figure of 0 through 9), and "1428"="円". Thereby, "予想金額 (predicted amount of money)" indicated with the sixteen digit code is the 1st data, and "2130 金" by the twenty digit code the 2nd data. By representing a letter or character with four digit numerical figures, 10,000 kinds of letters and marks can be represented. The value of "display" of the output control data indicates the digit number of an output data indicating the display mode, here it is always "1". And, if the output data corresponding to it is "0", it indicates the data is for emergency or urgent usage, "1" for ordinary display, "2" for no display. The value of "audio" of the output control data indicates the digit number of an output indicating a code of audio message, since it is two digits here, then, it is possible to handle the codes indicating one hundred kinds of audio messages as an output data. In case that the output control data is "00", no audio output appears.

Hereinafter, in the same manner as in the above, the output control data shown in FIG. 11 which are aligned from the top to the bottom constitute the output control data shown in FIG. 10. This data is so constructed that the output control data per se can be interpreted by an assumption that every two digits corresponds to the value of one output control data. Here, the number of the output control data is included in the header in the embodiment mentioned above, however, it is not necessarily included in the header if the number of the output control data is constant and not variable.

The received data as previously described is transmitted to the display device shown in FIG. 6 through the serial I/F 34 of FIG. 3.

Figure 12:
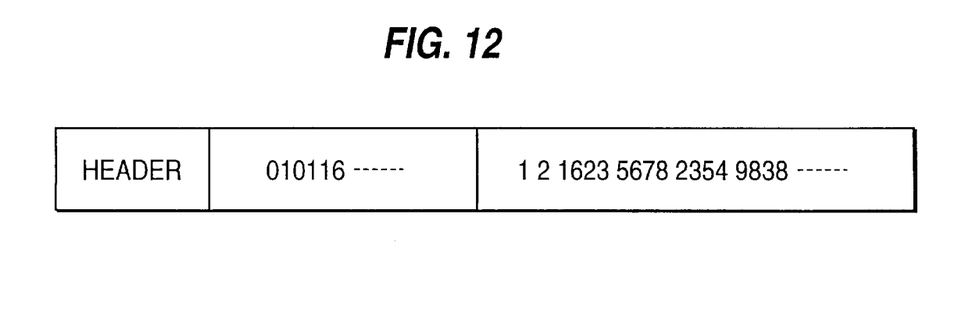
FIG. 12 shows the message code to be transmitted according to the present invention.
Figure 13:
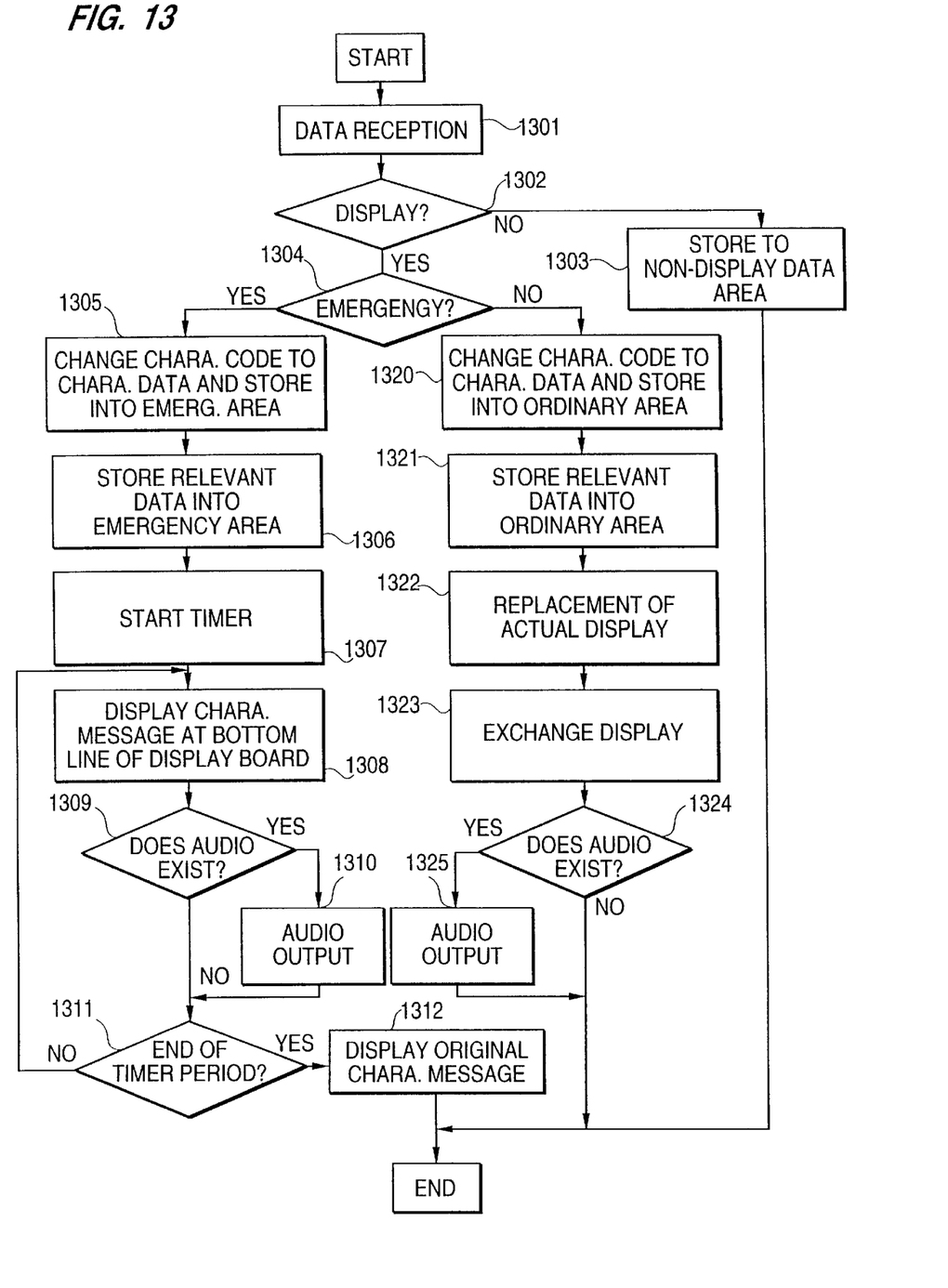
FIG. 13 is a flow chart showing a display control process with the display device according to the present invention.

The display device 5 receives the data of such record unit having the format as shown in FIG. 12, which is transmitted from the pager adapter 6, and conducts the process as shown in the flow chart of in FIG. 13. Here, in the RAM 64 are provided not only the work area for temporarily storing of the received message code, but also an ordinary area and emergency area.

Figure 14:
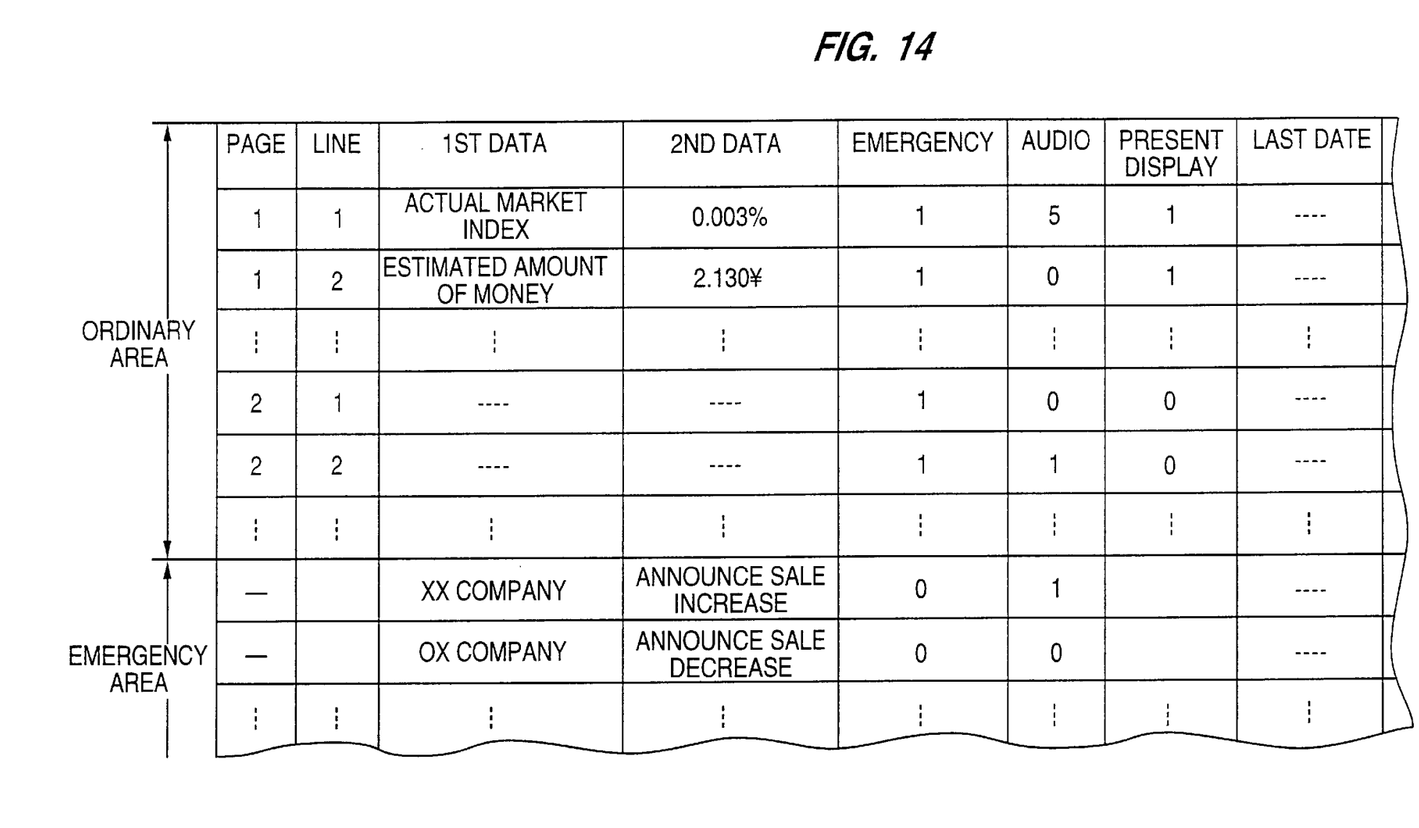
FIG. 14 shows display control data stored in a memory after being changed into display data with the display device in accordance with the present invention.
Figure 18:
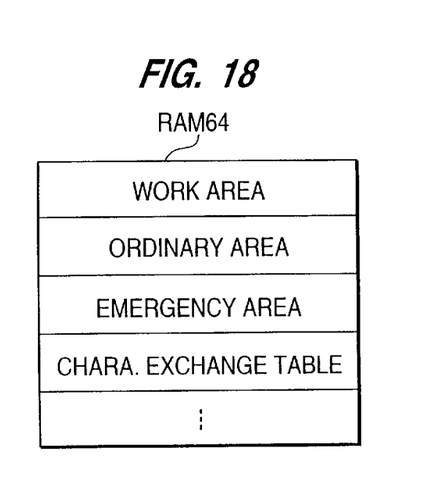
FIG. 18 shows areas of a RAM of the display device according to the present invention.

Further, a character exchange table is also stored in the RAM 64 as shown in FIG. 18. First, the data received through the interface 61 is stored into the RAM 64 (step 1301), then it is decided to display the relevant record immediately or not (step 1302), by referring to the value of the "display" of the output data shown in FIG. 11. When the value of the "display" is "2" and the non-display is indicated, the data is stored into the non-display area of the RAM 64 to end the process (step 1303). The data of the non-display area is the information not to be displayed on the over-the-counter display board available to customers, and it is used for transmitting the data to which only personnel of the office such as clerk can refer. The data can be referred to by using a monitor of a computer which is separately provided. If the value of the "display" is "0" (emergency) or "1" (ordinary) in the decision of the step 1302, next it is decided whether the display information is for the emergency or the ordinary usage depending on the value of the "display", "0" or "1" (see, step 1304). As a result of this, in case of an emergency, the letter or character code (in case of FIG. 11, the output data "1st data" and "2nd data") are taken out among the output data, and those letter or character code are changed to the character data by referring to the character exchange table prepared in the RAM 64 and stored into the emergency area of the RAM 64 (see, step 1305). Next, the relevant data of that record, i.e., the values of "page", "line" and "display" etc. are stored into the emergency area corresponding to the letter data mentioned above (see, step 1306). On the other hand, it is determined to be an ordinary display by the step 1304, the exchange from character code to character data and the storage of the character data and the relevant data into the ordinary area of the RAM 64 is effected (see, steps 1320 and 1321). Here, the character data means the input data to the display board for displaying letters, and it is the input data per se when the display board has function of receiving JIS (Japanese Industrial Standard) code, etc., as the input data and of exchanging and displaying thereof. When receiving a data of bit map type as the input data, the bit map data per se is received. In this way, the examples of the data on respective areas of the RAM 64 are shown in FIG. 14 when the display data of emergency type or of ordinary type is transmitted, and one vertical line corresponds to the data (data of record) of one line of the display board.

However, the item "present display" in FIG. 14 will be explained later.

In case of an emergency, when the character data and the relevant data are stored into the emergency area as mentioned previously, then the timer 66 (see, FIG. 6) is started (see, step 1307) and the character data of the record is displayed on the bottom line of the display board provided for display of emergency information thereon (step 1308). Further, it is checked if the value of the "audio" is "1" or not (step 1309). And if it is "1", the audio data corresponding to the code which the data of the "audio" on the emergency area indicates is taken out by referring to the audio exchange table of the audio ROM 67. This data is changed into the audio signal through the audio data exchanger portion 68 to be output through the speaker 69 (see, step 1310). Here, the audio signal is not such data of the letter data, each of which is correlated with the transmission code by every one sound, but rather the audio signal which is gathered as one corresponds to one audio code. In this way, the display of the emergency message and the output of audio are performed during the time period preset by the timer 66 (see, step 1311), and when the display of the emergency message on the bottom line of the display board is completed, and the display returns back to the original display to end the process (see, step 1312). The process of distinguishing the emergency message mentioned above and of displaying again the original message can be performed by sending release data from the personal computer 1, alternatively by operating the operation portion 65 of the display device 5. It is apparent that the position of emergency display is not limited to only the bottom line of the display.

If the value of the "display" is determined to be "1" in the step 1304, namely when the record of ordinary display is transmitted and the data thereof is stored onto the ordinary area, the "present display" of that record is changed to "1" and a flag is set up to indicate the condition of displaying.

Also, at the position where the record will be displayed (a line of the display board), the "present display" is changed to "0" and a flag is set up to indicate the condition of non-displaying (see, step 1322). And, the character data are actually sent to the display board 8, and the display is changed accordingly (see, step 1323). Further, in the same manner as in case of an emergency type, if the audio code is transmitted, then it is changed into the audio signal to be output (see, steps 1324 and 1325) and the process is thereafter stopped.

As explained above, even if the display data is of a large amount, according to the present invention, it is possible to transmit and display the data rapidly with an inexpensive device, by using the paging system, and also to perform interruption of the display for emergency information. In the above explanation, it is explained that the display control and audio output control are performed by the display device positioned remotely at a long distance. However, the invention is not limited thereto, and it is also possible to perform a so-called on-off control of a power source switch to the display device by data transmission using the pager system. Also, the device to be controlled is not limited to a display device, and the present invention can be effectively adopted to a remote control operation of other devices.

In the above explanation, the display characters are transmitted one by one corresponding to a four digit numerical figure code, and are changed to the character data one by one by to be displayed by referring to the character exchange table, when being displayed. According to this method, display message data composed of arbitrarily aligned 10,000 kinds of characters (including numerical figures and marks) can be transmitted by using the four digit code. However, the combination of aligned characters to be displayed is limited depending on the system. For instance, in the example of the display on the display board of the stockbroker in FIG. 14, "現場指数 (actual market index)", "予想金額 (estimated amount of money)", a name of the company, such as "○○会社 (○○ company)", or the numerical figures are the display messages. Then, for example, if it is sufficient with 10,000 kinds of the aligned characters and marks other than the numerical figures, they can be presented by the numerical figure code of four digits. Therefore, in this case, only a suffix indicating whether it is numerical figures or not, aligned character code of four digits, and the data for the number of digits may to be transmitted, in comparison with the transmission by coding every character, so that the data amount to be transmitted can be greatly reduced. Also according to this method, a table for defining correspondence between the received character code and the data of character line is provided as the character exchange table in the RAM 64 at the receiver side. In this method, the same methodology to the exchange process of the above-mentioned audio code is adapted with respect to the letter line.

A data display system based on a paging signal according to the present invention will now be explained, using a broadcasting function of the paging system. The basic structure of the system is similar to the previous explanation. However, in the ID-ROM 43 of FIG. 4 is also registered an ID code for broadcasting other than the ID code of the machine per se. Such an ID code for broadcasting is an ID code which has been provided in the paging system. The decoder portion 42 of FIG. 4 is so constructed that it receives the transmitted data transmitted from the personal computer 1 as if it directed to it, when the ID code of it coincides with the ID code for broadcasting. According to such construction, for instance, when spreading and displaying the same information simultaneously on the display boards provided at respective branches of a stockbroker, for example, the display at plural branches can be rapidly achieved by sending the whole message only one time at the transmitter side (of course, by separately transmitting the divided data several times since generally it is impossible to send the data table by eight digits, as shown in FIGS. 7 and 8).

Furthermore, it is possible to construct an effective display system as shown in the following by making the character exchange table within the RAM 64 of the display device correspond to the code and the character line, and by separately providing the contents of the table depending on the places or on the viewers, in the data display system based on paging signal using the broadcasting function.

TABLE 1

| Code | Kind of Message | Actual Message |
|---|---|---|
| 00 | Warning Information for Earthquake | (In case of self-government near an ocean) Now, an earthquake has occurred. Since there is a possibility of a tidal wave, please pay careful attention, especially residents near seashore. (In case of self-government near a volcano) Now, an earthquake has occurred. Since there is a possibility of eruption of the volcano XX, please pay careful attention, especially residents in a mountainous area. |
| 01 | Information for Earthquake Evacuation | Now, an earthquake has occurred. Citizens of XX city, please go to ○○ citizen's hall soon. ("XX city" and "○○ citizen's hall" are to be determined by the respective self-government) |
| 02 | Warning Information for Typhoon | (In case of self-government near an ocean) Now, a typhoon is approaching this region. Please fully make attention, especially the ships on the ocean. (In case of self-government of a mountainous area) Now, a typhoon is approaching this region. Please pay careful attention, especially people climbing the mountain XX. |

The above table 1 shows an example adapted to a system for providing notifying information for preventing a disaster to respective self-governments from a disaster prevention headquarters of an area, wherein the pager adapters and the display devices are provided in public facilities of respective self-governments. In this example, there are provided only three kinds of message codes, for purpose of more comprehensive explanation, and the sentences of the message corresponding thereto is shown in the column "actual message" of the table. Such information are provided within a RAM 64 of the display device as the character exchange table. Actually, the table is transferred from a ROM or other storages media to the RAM 64 when it is used. As seen from table 1, the code "00" is an earthquake warning, and the contents of the warning differ for the self-governments near the seashore and for the self-governments near volcanoes. The code "01" is an information for evacuation when an earthquake occurs, the "XX" of the "citizen of XX" is the name of the corresponding city, and "○○ citizen's hall" the name of the citizen's hall designated as a place of safety, which are included in an information for the respective area. Of course, it is not limited only to the city but also applicable to a system for a smaller self-government, using names of "XX town" or "XX village" as well as "○○ primary school" or "ΔΔ gymnasium" designated as the place of safety.

And, the code "02" is a warning of a typhoon, the contents of which is changed depend on the location of the self-governments, near to the ocean or in a mountainous area. By preparing such various contents of message depending on the locations, it is possible to broadcast the warning information, simultaneously, adopted to respective self-governments only by sending one code by the disaster prevention headquarters in the mode of a notifying warning, and also to respond quickly with certainty even under an emergency. The information for preventing disaster can be combined with the display of the character line on the display board, or alternatively by sound, thereby notifying the same information more effectively.

TABLE 2

| Code | Kind of Message | Actual Message |
|---|---|---|
| 00 | Information for Sightseeing | (In case of Kyoto) Welcome to Kyoto. Now is the best season to visit in and around Kiyomizu temple for enjoying closof autumn leaves. (In case of Sapporo) Welcome to Sapporo. Please visit Sapporo Snow festival held from 20$^{th}$ of Jan. to 10$^{th}$ of Feb. |

Table 2 shows an example of the contents of message of a system, in which the headquarters of tourist agency send necessary information to a respective branches. In the case of this example, the messages corresponding to a respective code are determined by respective branches, and has been already prepared as the character exchange table in the RAM 64 of the display device 5. The central headquarters has decided the information to be transmitted depending on the time, and the personal Computer at the headquarters automatically transmits the code corresponding to the information through the public network 3 and from the base station 4 of the pager through the wireless radio circuit, to the pager adapters 6 at the respective branches in the broadcast mode, thereby separated branches can automatically afford to display the information appropriate to respective seasons of the areas.

TABLE 3

| Code | Kind of Message | Actual Message |
|---|---|---|
| 00 | Information of Big Bargain Sale | Your attention, please. Now we are offering a big bargain in washing machines on the 2nd floor. We await your visit. (The article for big bargain is determined by the respective store.) |
| 01 | Information of Leading Article | Your attention, please. Now we are offering ○○ products made in XX on the 3rd floor. We await your visit. (The leading article is determined by the respective store.) |

The table 3 shows an example of the contents of message of a system, in which the headquarters of department stores send necessary information to respective branch stores. In this example, also the messages corresponding to a respective code are determined by respective branch stores, and have been already prepared as the character exchange table in the RAM 64 of the display device 5. And in the same manner as in the case of the tourist agency in the table 2, the display of the information at the respective branch stores can be automatically achieved by transmitting the code in the broadcasting mode from the central headquarters of the department stores depending on the time. Here, even in the case of the tourist agency and the department stores mentioned above, it is possible to perform more effectively by further outputting an audio message.

When the number of the messages is small as shown in the tables 1 through 3, it is also possible to display the information at the respective branches and the facilities of the self-government, etc., by only one time of transmission through the paging system at the sender or transmitter end, thereby making possible to perform the display of the information with simple equipment.

According to the present invention, as is apparent from the aforementioned detailed description, by using the paging system, it is possible to display much information on the display boards and to provide control thereof, which are located at a long distance from a transmitter, with a simple system but without complicated operation, and it is possible to achieve the display more effectively by further utilizing audio information. Moreover, it is also possible to easily perform notification under emergency conditions provide broadcasting information to a large number of branches simultaneously by using the broadcasting function of the paging system.

What is claimed is:

1. A data display system based on a paging signal, comprising:

a transmission terminal for coding a message for display and control information into message codes, for dividing said message codes into sub-message codes, each sub-message code having a length so as to be transmitted by one transmission operation in a paging system, for forming a transmission signal of a paging system by adding an ID code for calling-up a respective one of said sub-message codes, and for transmitting said transmission signal sequentially by automatically accessing a public network, said transmission terminal including signal sound detection means for detecting a sound of an input waiting signal from a terminal station of the public network which receives said ID code, after generating said ID code, thereby to send one of said sub-message codes when said signal sound detection means detects the input waiting signal;

a pager adapter for receiving said transmitted signal registered with said ID code from said transmission terminal through said public network and a wireless base station of the paging system so as to take out said message codes;

display means; and display control means for processing the message codes from said pager adapter so as to form display data to be displayed on said display means and to control the display thereof.

2. A data display system based on paging signal as defined in claim 1, wherein said transmission terminal further includes a timer which starts when said ID code is generated, and for outputting an input signal when expiring a preset time, thereby to send one of said sub-message codes when said timer outputs the input signal.

3. A data display system based on paging signal as defined in claim 1, wherein said transmission terminal further includes means for generating an interception signal to intercept an information message to be from a terminal station of the public network which receives said ID code, and starting at the same time of the output thereof and outputting an input signal when a preset time expires, thereby to send one of said sub-message codes when said interception signal generating means generates said input signal.

4. A data display system based on paging signal as defined in one of claims 1, 2 and 3,
wherein said display control means includes a character code exchange table, thereby exchanging a character code within said message code into character data which can be displayed on said display means by using said character code exchange table.

5. A data display system based on paging signal as defined in one of claims 1, 2 and 3, wherein said display control means includes an audio code exchange table and audio signal generating means, and said display means includes a speaker, thereby exchanging an audio code within said message code into an audio data by using said audio code exchange table and exchanging said audio data into an audio signal with said audio signal generating means so as to provide an output to said speaker.

6. A data display system based on paging signal as defined in one of claims 1, 2 and 3, wherein said display control signal includes information indicating an emergency display.

7. A data display system based on paging signal as defined in one of claims 1, 2 and 3, wherein said pager adapter is registered with another ID code for broadcasting use other than the ID code of said pager adapter.

8. A data display system based on paging signal as defined in claim 7, wherein said display control means includes a character code exchange table, thereby exchanging a character code within said message code into character data which can be displayed on said display means by using said character code exchange code.

9. A data display system based on paging signal as defined in claim 8, wherein said character code exchange table is variably presetable.

10. A data display system based on paging signal as defined in claim 7, wherein said display control means includes an audio code exchange table and audio signal generating means, and said display means includes a speaker, thereby exchanging an audio code within said message code into an audio data by using said audio code exchange table and exchanging said audio data into an audio signal with said audio signal generating means so as to provide an output to said speaker.

11. A data display system based on paging signal as defined in claim 10, wherein said audio code exchange table is variably presetable.

12. A data display system based on paging signal as defined in claim 7, wherein said display control signal includes information indicating a emergency display.

* * * * *